United States Patent [19]

Sakamoto

[11] Patent Number: 4,618,239

[45] Date of Patent: Oct. 21, 1986

[54] PHOTOGRAPHIC APPARATUS AND MEASUREMENT METHOD OF EXPOSURE CONDITIONS

[75] Inventor: Takashi Sakamoto, Kyoto, Japan

[73] Assignee: Dainippon Screen Seizo Kabushiki Kaisha, Kyoto, Japan

[21] Appl. No.: 657,751

[22] Filed: Oct. 4, 1984

[30] Foreign Application Priority Data

Oct. 12, 1983 [JP] Japan .................. 58-189352

[51] Int. Cl.[4] .................. G03B 7/099; G03B 27/74
[52] U.S. Cl. .................. 354/477; 354/432; 354/76; 355/56
[58] Field of Search .................. 354/75, 76, 77, 79, 354/219, 110, 111, 118, 119, 432, 477; 355/56

[56] References Cited

U.S. PATENT DOCUMENTS

| | | | |
|---|---|---|---|
| 3,546,378 | 12/1970 | Karikawa | 354/75 |
| 3,832,058 | 8/1974 | Gusovius | 355/56 |
| 3,883,883 | 5/1975 | Sano et al. | 354/75 |
| 4,021,115 | 5/1977 | Jeppesen | 355/56 |
| 4,364,650 | 12/1982 | Terashita et al. | 354/432 |
| 4,488,804 | 12/1984 | Takagi | 355/56 |

Primary Examiner—Russell E. Adams
Attorney, Agent, or Firm—Hayes, Davis & Soloway

[57] ABSTRACT

A photographic apparatus comprises a photoelectric camera arranged movably at the position of the lens of the photographic apparatus and a picture signal processing circuit connected electrically with the photoelectric camera and adapted to process picture signals, which have been input to the photoelectric camera, so as to measure given exposure conditions. It is possible to determine exposure conditions with good accuracy by measuring accurately variations in illumination conditions. The present invention allows highly-accurate measurements under preferred conditions.

3 Claims, 6 Drawing Figures

PHOTOGRAPHIC APPARATUS AND MEASUREMENT METHOD OF EXPOSURE CONDITIONS

BACKGROUND OF THE INVENTION (1) Field of the Invention

This invention relates to a photographic apparatus such as photoengraving camera or the like, and more particularly to a photographic apparatus permitting automatic control of optimum exposure conditions by means of a microcomputer or the like, as well as to an exposure controlling method.

(2) Description of the Prior Art

Photoengraving cameras are used to take continuous tone pictures and pictures of line subjects, each of which requires a single exposure, and halftone pictures which need individually an auxiliary exposure such as flash exposure or the like in addition to a main exposure. Whichever picture is taken, it is unable to obtain a reproduced picture of good quality unless suitable exposure conditions are set up.

Upon setting up exposure conditions, the optimum values of the light source intensity, exposure time and iris value were determined for many years by individual operator's experiences while taking the density of a given copy and the desired photographic magnification into consideration. However, a variety of automatic exposure control systems have been developed in recent years.

Such conventional automatic exposure controlling methods may be divided roughly into two types, namely, (1) the copy density measurement type and (2) the focus-point photometric type.

In the copy density measurement type (1), magnification and iris value are first of all set up usually in addition to the density of a copy. Then, a calculation is made on the basis of these data to determine a suitable exposure time.

The copy density measurement type (1) features as its advantage that it can readily follow magnification variations and copy density changes over a broad range. On the other hand, it is accompanied by many problems for performing automatic exposure control with good accuracy that it requires a separate densitometer to measure the densities of the high-light point and shadow point of each copy; it is indispensable, when the reciprocity law failure has occurred, to perform complex calculations and processings including changes of reciprocity law failure to correct the reciprocity law failure; and it must follow variations in illuminance distribution on each copy and changes in basic data to be developed by deterioration of light sources or lamp replacement.

On the other hand, the focus-point photometric method (2) may be practiced by way of example by choosing the exposure time first of all and then by measuring brightness such as the high-light point and shadow point on a picture placed on the focus point to adjust the iris value and the intensity of each light source. It does not require any densitometer. Accordingly, it is not necessary to go through with such work as the setting of a density.

It can also control an important point on the focus point such as the high-light point by means of a sensor to keep the brightness of the important point at a constant level. Therefore, there are such merits that it permits to hold the exposure time at a constant level and it does not require to take the reciprocity law failure into consideration.

However, the light quantity adjustment term is generally centered at the iris value. Thus, the focus-point photometric method (2) is accompanied by a drawback that the adjustable range of the iris value is limited and no optimum iris value may be set for the reproduction of a picture of good resolving power.

Furthermore, a light sensor is required to show good reproducibility as to its sensitivity upon measurement of brightness. A light sensor having an extremely high level of sensitivity is required for the measurement of the brightness of each shadow point.

In the focus-point photometric method (2), a sensor is in its entirety housed in a hand stand (camera bag). It is thus difficult to practice the focus-point photometric method (2) with a roll film type camera which imposes limitation on work by the hand stand.

Both of the above-mentioned conventional methods (1) and (2) are accompanied by such inconvenience that an operator is required to find out the high-light point and shadow point from a picture on a copy or the picture image of the copy projected on the focus point and then to measure the density at each of the points.

According to the second embodiment of the focus-point photometric method (2), the exposure time may be controlled in accordance with the brightness of an image on the focus point without adjusting the iris value. This method is an intermediary method of the above-described two methods and is still accompanied by one or more of the drawbacks of the two methods.

SUMMARY OF THE INVENTION

The first object of this invention is to fully automate exposure conditions which have conventionally been set up in a trial and error fashion by each operator in accordance with his experiences, thereby to release the operator from such cumbersome work.

The second object of this invention is to provide a photographic apparatus and exposure controlling method, each of which permits the prompt and accurate setting-up of suitable exposure conditions in accordance with variations in the illuminance distribution on the surface of each copy, the influence of the $\cos^4\theta$ law, variations in the density of the copy, changes in the intensity of each light source and the like.

It has been found that the above objects can be achieved by arranging a photoelectric camera such as CCD camera (solid-state pickup camera) at the lens position of a photoengraving camera or the like, measuring conditions of a copy per se, such as copy density and the like, and illumination conditions such as the illuminance distribution on the surface of the copy and the intensity of each light source as electrical signals by means of the solid-state pickup camera, finding out the high-light point and shadow point in a desired trimming of the copy, and then to calculate and measure the various exposure conditions.

In one aspect of this invention, there is thus provided a photographic apparatus which comprises a photoelectric camera arranged movably at the position of the lens of the photographic apparatus and a picture signal processing circuit connected electrically with the photoelectric camera and adapted to process picture signals, which have been input to the photoelectric camera, so as to measure given exposure conditions.

In another aspect of this invention, there is also provided a photographic apparatus which comprises light-reflecting means arranged between a copy holder and a lens and on the optical axis of the photographic apparatus, a photoelectric camera arranged on the axis of light reflected by the light-reflecting means and at a position equivalent to the lens, and a picture signal processing circuit connected electrically with the photoelectric camera and adapted to process picture signals, which have been input to the photoelectric camera by way of the light-reflecting means, to measure given exposure conditions.

In a further aspect of this invention, there is also provided a method for measuring exposure conditions upon photographing a copy, which method comprises mounting the copy, which is to be photographed, on a copy holder of a photographic apparatus, positioning a solid-state pickup camera at the position of the lens of the photographic apparatus or at a position equivalent to the position of the lens, converting light from the copy to electrical signals by the solid-state pickup camera while maintaining the illumination for the copy under the same conditions as that employed for photographing, and processing the electrical signals by a picture signal processing circuit.

According to the present invention, a photoelectric camera such as CCD camera is arranged at a position equivalent to a photoengraving lens. Thus, it is possible to determine exposure conditions with good accuracy by measuring accurately variations in illumination conditions. Therefore, the present invention can improve the reliability and operability leapingly.

Furthermore, a solid-state pickup camera such as CCD camera or the like is provided on the front wall of a lens stand and illumination conditions are measured while maintaining the main light source for the principal photographing in a turned-on state. Compared with the above-described focus-point photometric method, the light quantity is sufficiently high and the brightness of light entering the solid-state pickup camera is kept unchanged even if the photographing magnification changes. Therefore, the present invention allows highly-accurate measurements under preferred conditions.

The above and other objects, features and advantages of the present invention will become apparent from the following description and the appended claims, taken in conjunction with the accompanying drawings.

DETAILED DESCRIPTION OF THE INVENTION AND PREFERRED EMBODIMENTS

Figure 1:
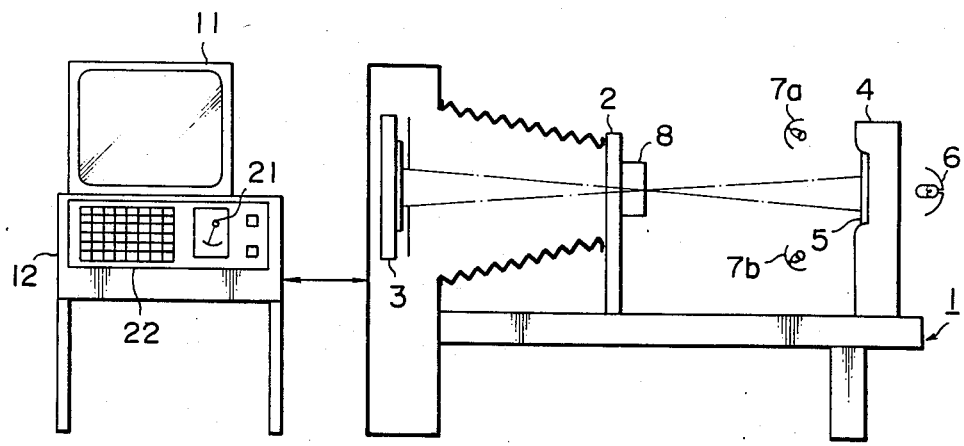
FIG. 1 illustrates schematically one example of photoengraving cameras suitable for use in the practice of this invention.

In a photoengraving camera depicted in FIG. 1, a lens stand 2 having an optical axis in the horizontal direction is mounted on a base 1 displaceably back and forth between a fixed film stand 3 and a movable copy stand 4.

A copy 5 mounted on the copy stand 4 is illuminated from the back by a lamp 6 where the copy is a transparent copy or from the front at angles of about 45° by two lamps 7a, 7b where the copy if a reflection copy.

Figure 2A:
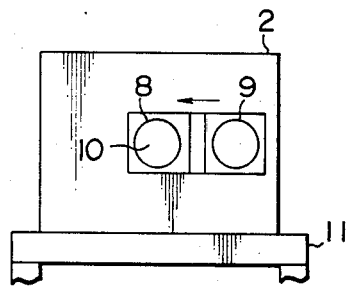
FIG. 2(a) is a simplified side elevation of the lens stand of the camera.

On the lens stand 2, a photoengraving lens 8 and a CCD camera 9 are for example arranged side by side as shown in FIG. 2(a). The photoengraving lens 8 and CCD camera 9 are rendered slidable horizontally and automatically relative to an optical axis 10 by means of a motor-controlled mechanism which will be described herein. Thus, the photoengraving lens 8 and CCD camera 9 are positioned selectively at the center of the lens stand 2.

Figure 2B:
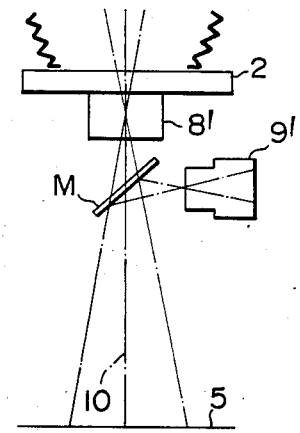
FIG. 2(b) shows the outline of one way of providing a CCD camera beside the lens stand.

Instead of shifting the photoengraving lens 8 and CCD camera 9 to switch from the photoengraving lens 8 to the CCD camera 9 and vice versa, the system shown in FIG. 2(b) may also be employed by way of example. In FIG. 2(b), a half mirror (or movable mirror) M is provided at an angle of 45° relative to the optical axis 10 and a CCD camera 9' is placed at a position equivalent to a lens 8' of the lens stand 2 so as to detect each picture image.

Numeral 11 indicates a monitor screen mounted on an operation panel 12.

The CCD camera 9 is of such a system that charge coupled devices are arranged for example to make up 200×200 picture elements or so, each input picture image is converted photoelectrically, resulting electric signals are stored picture element by picture element, the picture elements are scanned in accordance with a predetermined clock and the electric signals are thus output as picture signals. The resulting picture image is displayed on a monitor screen 11 by way of a video controller 13 (see, FIG. 3).

On the monitor screen 11, there are displayed not only an image of the photographed original picture but also a trimming hairline cursor, histograms, characteristic curves and the like. Namely, the principal objective of the monitor screen 11 is to facilitate positional confirmation which is required upon reproduction of a picture, such as trimming of an original or the like. Thus, it does not require any particularly-high accuracy as to tone reproduction. In order to effect an interactive operation by means of the monitor screen 11, it is necessary to display a variety of characters, besides the image cursor.

Figure 3:
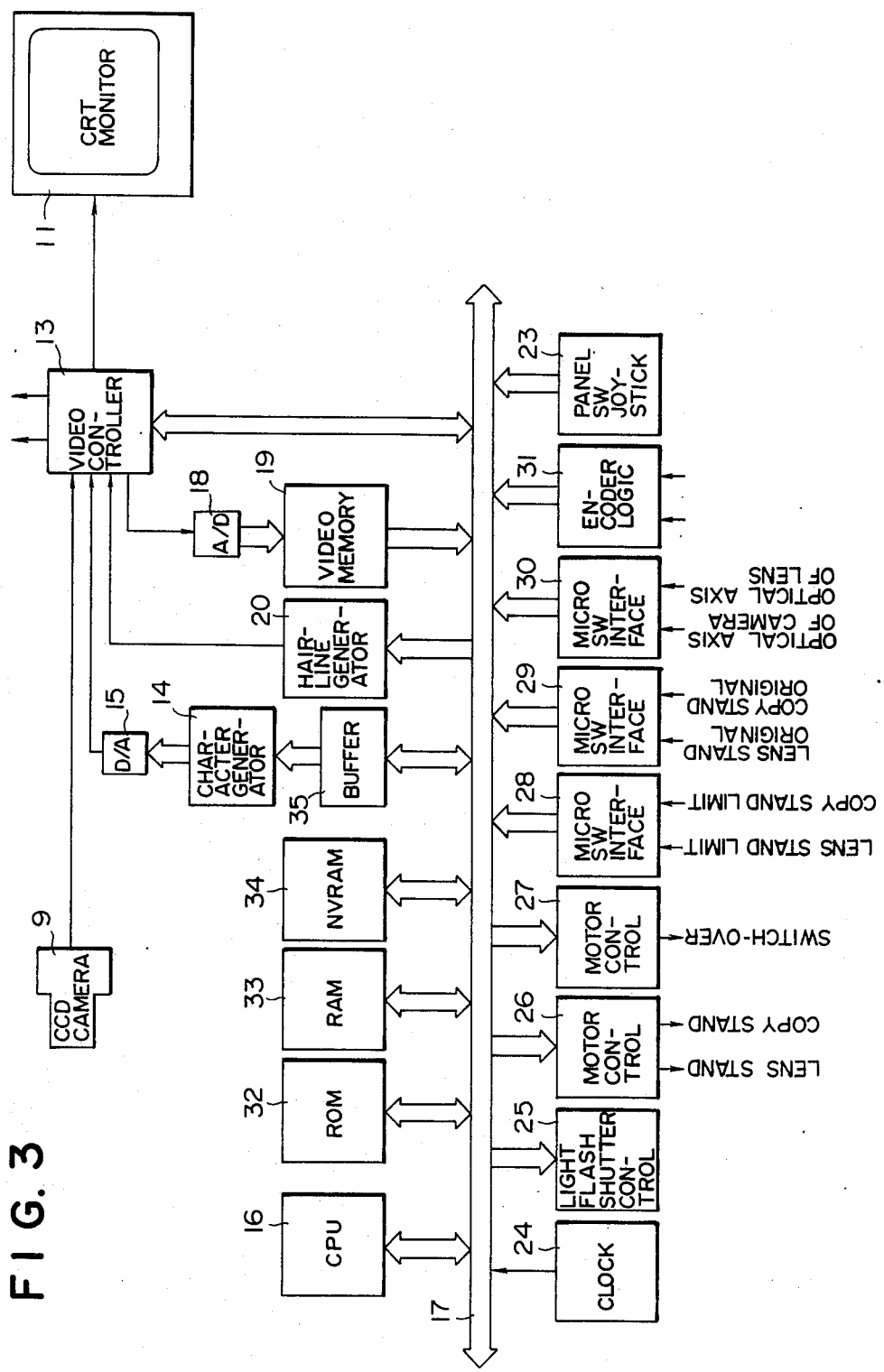
FIG. 3 is a block diagram showing the control system according to one embodiment of this invention.

FIG. 3 illustrates one example of a control unit for an automatic exposure control system, which control unit is useful in the practice of this invention.

A picture image from the CCD camera 9 is fed to a monitor screen 11 by way of a video controller 13. In the video controller 13, timing pulses $P_A$ and $P_B$ are produced. In accordance with the pulse $P_A$, character signals are fed from a character generator 14 through a D/A (digital/analogue) converter 15.

A microcomputer (CPU) 16 controls the video controller 13 through a bus line 17 and besides, performs such processings as MAX (highlight point), MIN (shadow point), histogram and the like on the basis of picture signals written in a video memory 19 by way of an A/D (analogue/digital) converter 18.

A hairline cursor generator 20 serves to display hairline cursors. For example, it allows to effect trimming on an image of a copy on the monitor screen 11 by operating a joystick 21 in the operation panel 12 (see, FIG. 1). This trimming can be performed by designating two diagonal points by a switch board 22 when the area to be trimmed is for example rectangular. Designated at numeral 23 is an interface between the operation panel 12 and bus line 17.

The bus line 17, which is connected with the CPU 16, is also connected to a clock generator 24, illumination and shutter controller 25, drive controller 26 for the lens stand 2 and copy stand 4, switching controller 27 for the CCD camera 9 and lens 8, limit switch interface 28 for the lens stand 2 and copy stand 4, original setting switch interface 29, optical axis setting switch interface 30 for the CCD camera 9 and lens 8, encoder logic 31 for automatic focus control, and ROM 32, RAM 33, NVRAM 34 and the like for storing photoengraving data. By the way, numeral 35 indicates a character buffer.

Figure 4A:
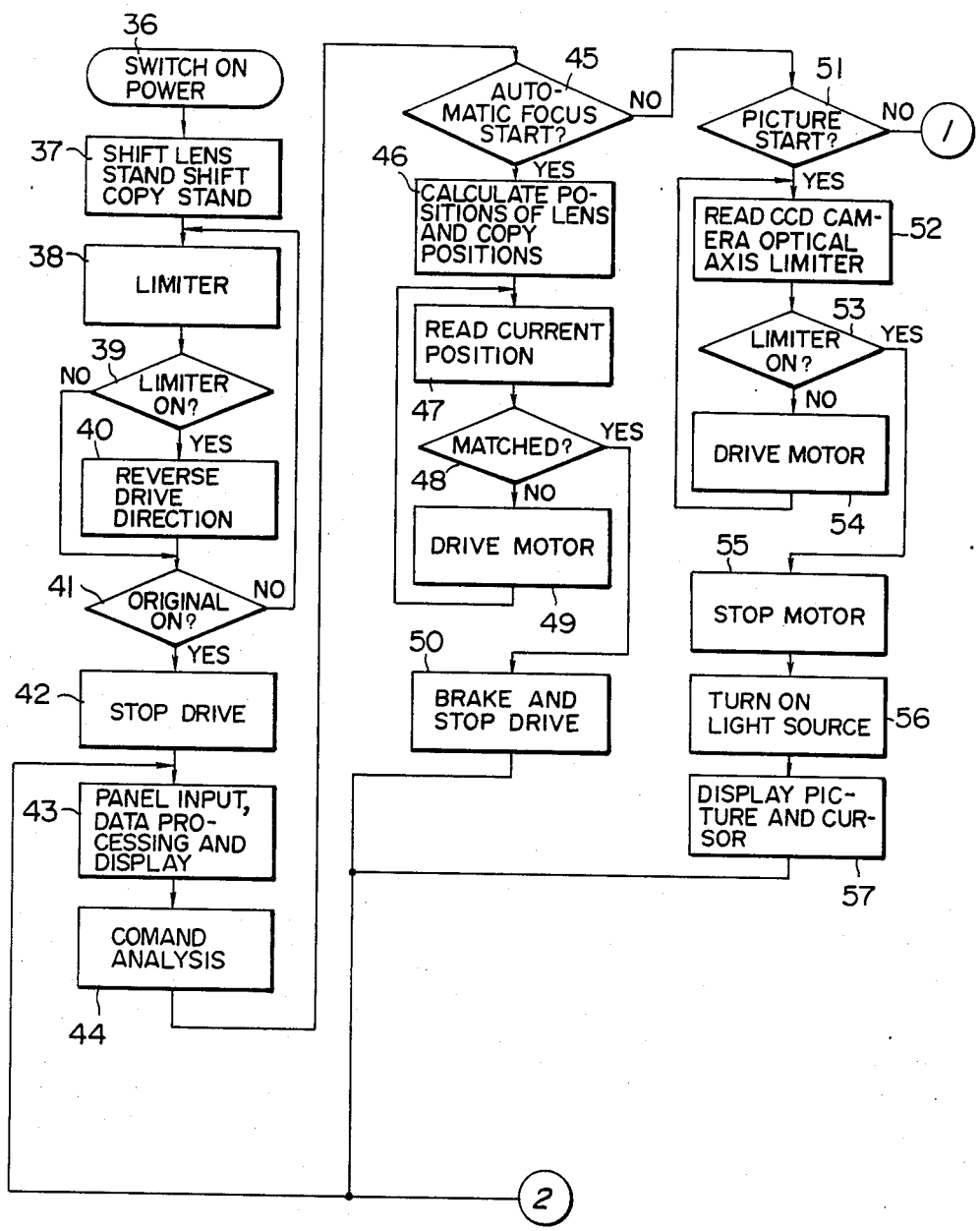
FIG. 4(a) is a flow diagram showing one example of general photoengraving processes which may be materialized in accordance with this invention.
Figure 4B:
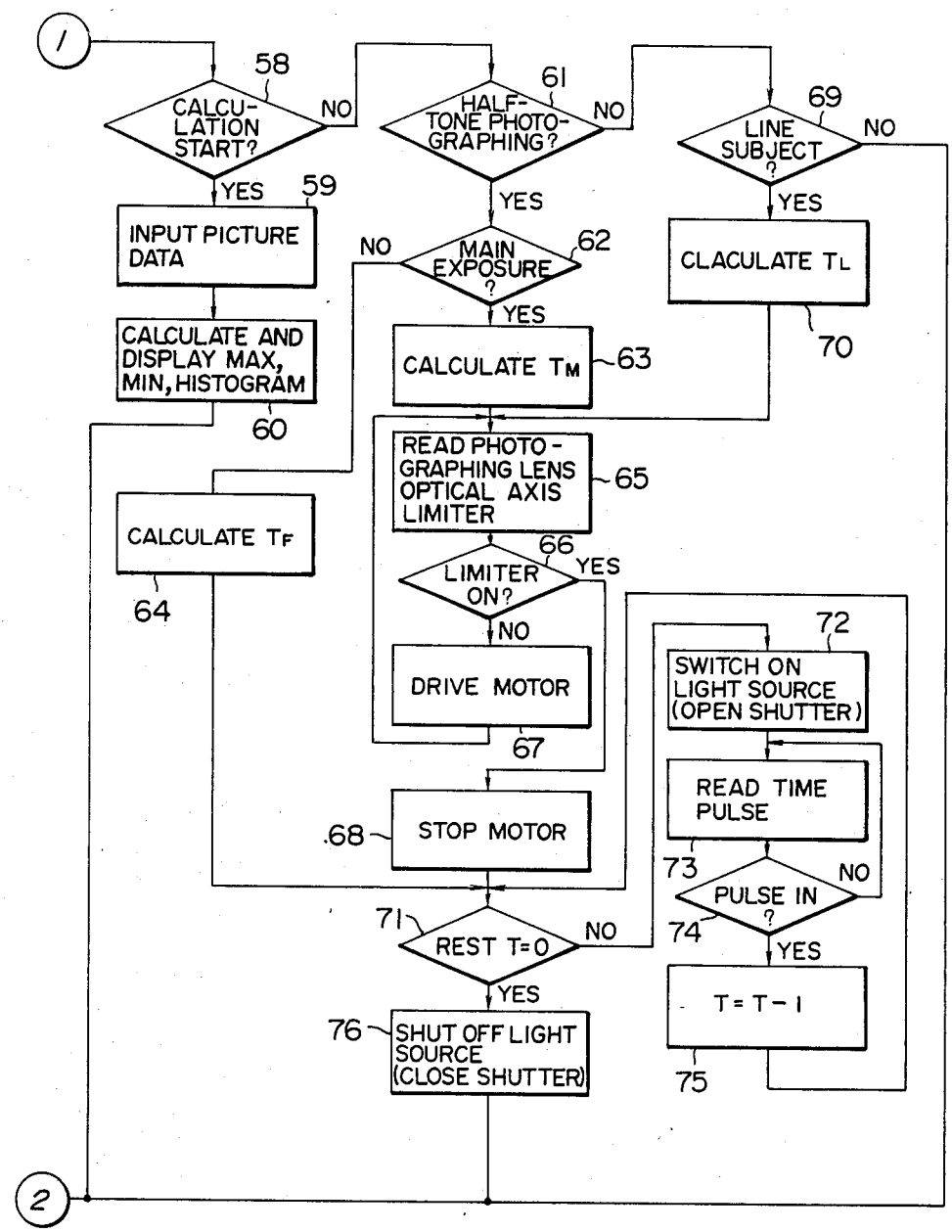
FIG. 4(b) is a flow diagram showing one example of general photoengraving processes which may be materialized in accordance with this invention.

A photographic control system which performs automatic focus control and in association with the ON/OFF of the light source and the iris value, exposure time control by the CPU 16 as mentioned above can measure illumination conditions for each copy by the CCD camera 9 in order to set up a suitable exposure time and can materialize the control of such a general photoengraving process as shown by way of example in FIG. 4.

When the power supply is switched on, the lens stand 2 and copy stand 4 are driven first of all. Their respective limit switches are then actuated to position them at their original points (step 36–step 42). Next, the copy 5 is mounted on the copy stand 4 and a desired magnification is input (or the dimensions of the original and those of its corresponding reproduction are input) from the switch board 22. Then, the automatic focus control (steps 45–50), photographing step by the CCD camera (steps 51–57), calculation step (steps 58–60) and halftone or line subject exposure step (steps 61–76) are performed successively.

In the photographing step by the CCD camera 9, the CCD camera 9 is first of all switched to the position of the optical axis and an image of the original, which has been taken by turning the light source on, is displayed on the monitor screen 11. Here, the focusing of the CCD camera 9 is carried out either manually or by an electric drive. The hairline cursor is also displayed at the same time. By operating the joystick, the designation of desired trimming is effected on the copy image on the monitor screen 11.

In the calculation step, calculations of the brightness of the brightest point (highlight point) and the darkest point (shadow point) [MIN, MAX] and histograms are performed as results of processings by the microcomputer 16. Calculation results and preset conditions are displayed on the monitor screen 11.

The above-described trimming function is useful in removing such copy conditions as MIN, MAX, histograms and the like from processed data when an area, which is outside the copy area or which is within the copy area but is not required to be photographed, is input.

Thereafter, the photoengraving lens 8 is moved again onto the optical axis of the lens stand 2. After setting the iris value and mounting a photoengraving film and a desired contact screen on the film stand 3, a halftone exposure (main exposure, i.e., exposure without flash or screen) or a line subject exposure is carried out in accordance with the exposure step.

When calculating not only the main exposure time ($T_M$) but also the flash exposure time ($T_F$) and then photographing continuously while keeping the light source in its switched-on state, it is necessary to provide the lens stand 2 with a shutter.

In the above embodiment, a CCD camera was referred to by way of example as a photoelectric camera. Any cameras may however be employed, including a vidicon camera, so long as they can convert incident light to their corresponding electric signals.

In the above manner, this invention has made it possible to perform light measurements, which are substantially similar to the focus-point photometric method, without need for touching the film stand 3 upon reproduction of a picture. Accordingly, this invention can be applied to an apparatus equipped with an automatic film feeding mechanism of the roll film type.

Since the image of a copy is taken in over a wide range and in a form divided into small sections owing to the use of a CCD camera in the present invention, it has become easier to determine the highlight point and shadow point and to calculate the histogram from data input to the CCD camera. Therefore, it has been materialized to determine exposure conditions automatically on the basis of the thus-obtained highlight point, shadow point and histogram.

This invention has brought about another merit that in order to effect the interactive operation with an image displayed on the monitor screen 11, the exposure operation can be performed while showing the image on the monitor screen provided that the photographic apparatus is of the roll film type and permits daylight operations.

Furthermore, the light measurement is effected by moving the CCD camera 9 to the position of the optical axis which the photoengraving lens is supposed to assume. Thus, the CCD camera 9 can detect with sufficient accuracy the illuminace distribution of an original relative to the light source and the influence of the $\cos^4\theta$ law. In other words, each operator is not required to make any changes even if the position of a light source is changed, the light source is deteriorated or the lamp of the light source is replaced, because such a change can be detected by the CCD camera as exposure conditions given at to the copy and illumination and is reflected to the processings of operation conditions in the present invention.

Having now fully described the invention, it will be apparent to one of ordinary skill in the art that many changes and modifications can be made thereto without departing from the spirit or scope of the invention as set forth herein.

What is claimed is:

1. A photographic apparatus comprising a photographic camera including a camera lens defining an optical axis, a photoelectric camera having a light sensing means to sense light conditions of a subject to be photographed, and means to position the photoelectric camera sensing means at a location which is in effect on the optical axis of the camera lens when it is in its normal operating position, said sensing means location corresponding to the location of the lens relative to a subject to be photgraphed, wherein said apparatus further comprises a light sensor processing circuit capable of measuring illumance distribution of the surface of a subject, $\cos^4\theta$ law effects, variation in density of a image, and changes in intensity of light sources.

2. A photographic apparatus in accordance with claim 1, wherein the apparatus further comprises a motor controlled by a light sensor processing circuit which drives the positioning means.

3. A photographic apparatus in accordance with claim 2, wherein the apparatus including the positioning means further comprises a subject holder, a photosensitive material holder, and a lens diaphram, at least one of which is automatically adjusted by said light sensor processing circuit.

* * * * *